Oct. 3, 1961 T. A. GROVE 3,002,380
COMPRESSOR EFFICIENCY TESTER
Filed Aug. 13, 1958 2 Sheets-Sheet 1

INVENTOR.
THERON A. GROVE
BY *Victor J. Evans & Co.*
ATTORNEYS

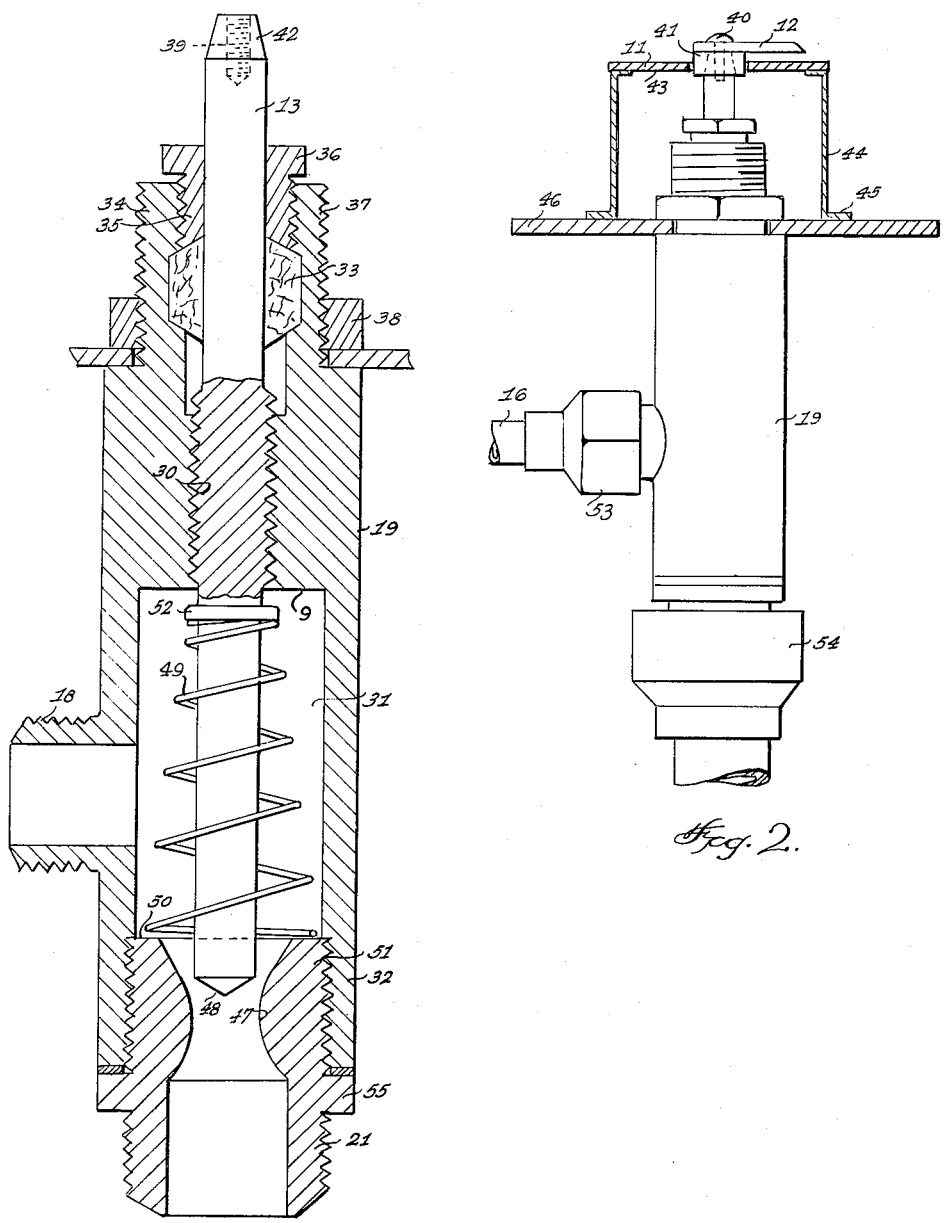

United States Patent Office 3,002,380
Patented Oct. 3, 1961

3,002,380
COMPRESSOR EFFICIENCY TESTER
Theron A. Grove, 1108 Franklin Road, La Grange, Ga.
Filed Aug. 13, 1958, Ser. No. 754,786
2 Claims. (Cl. 73—168)

This invention relates to testing devices such as used in combination with compressors, and in particular a tool for indicating accurately the volume of air or gas passing through a compressor when the compressor is operating on the job or after repairs and the volume of air or gas passing through the compressor is determined by means of gauges and the master valve with an adjustable venturi opening in the valve and with the valve connected to the high pressure line and also to the low pressure or suction line of the compressor.

The purpose of this invention is to ascertain the volume of air or gas passing through a compressor in order to determine the efficiency of the compressor.

It will be appreciated that compressors, particularly as used on the job, are subjected to abuse and, being used intermittently, and in all kinds of weather are not efficient. With this thought in mind this invention contemplates a testing tool having connections whereby a master valve is connected to high and low pressure connections of a compressor so that with the parts connected to gauges the condition of the compressor is readily ascertained.

The object of this invention is, therefore, to provide an attachment for a compressor whereby the volume of air or gas passing through the compressor is accurately indicated.

Another object of the invention is to provide a tester for a compressor in which the tester is designed to be connected to compressors now in use.

A further object of the invention is to provide a tester for compressors and the like in which the tester is of simple and economical construction.

With these and other objects and advantages in view the invention embodies a master valve, one side of which is connected to the high pressure line of a compressor and the other to the low pressure line, a pair of gauges positioned with one gauge connected by a tube with restricted connections at the ends, to the high pressure line and the other being connected by a similar tube with restricted sections at the ends to the low pressure line; and wherein the master valve is provided with an adjustable venturi through which the air or gas passes.

Other features and advantages of the invention will appear from the following description taken in connection with the drawings, wherein:

FIGURE 2 is a side elevational view of the master valve showing a pointer in combination with a dial on the upper end thereof.

FIGURE 3 is a vertical section through the master valve with the dial and pointer omitted and with the parts shown on an enlarged scale.

Figure 1:
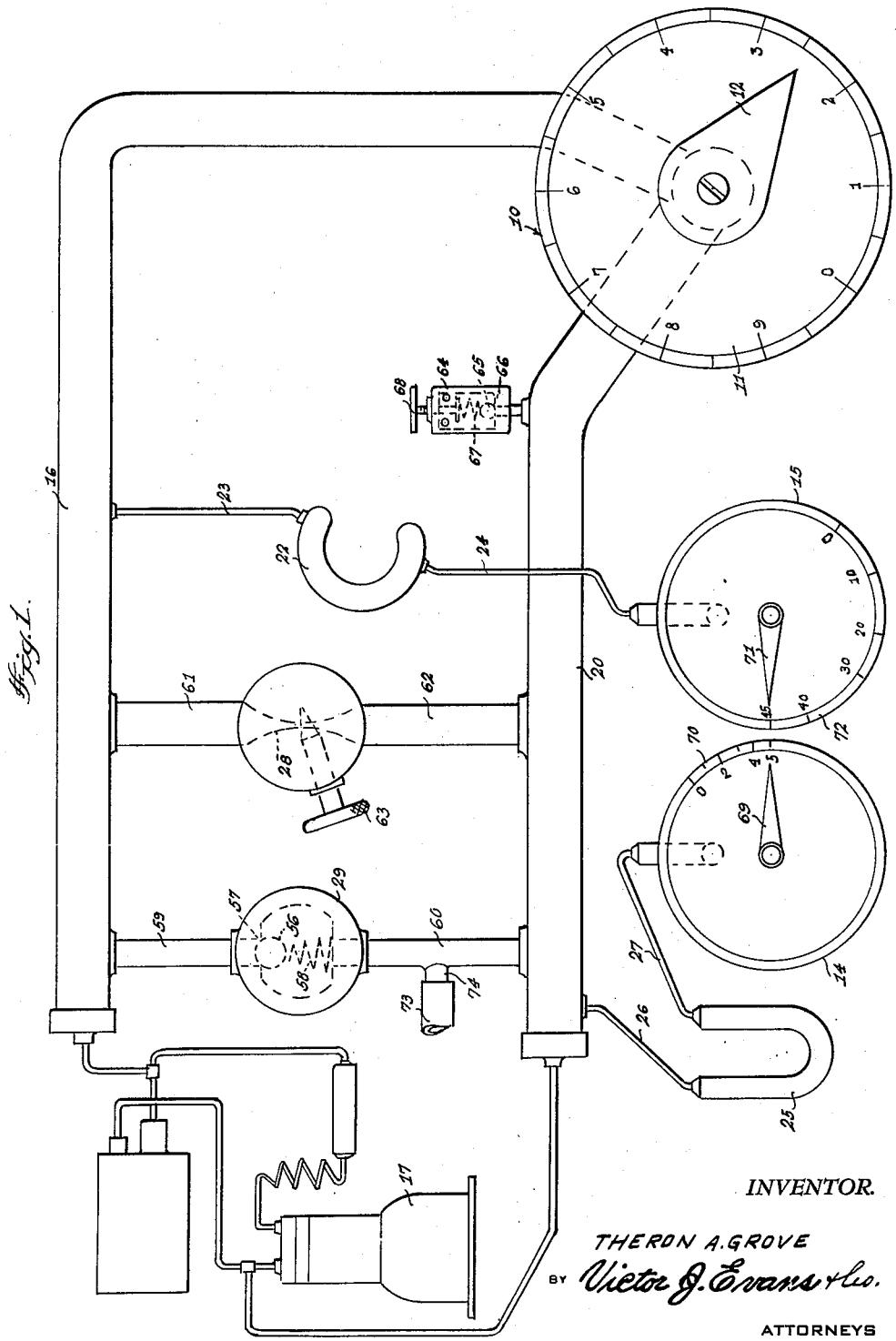
FIGURE 1 is a diagrammatic view illustrating the combination of the master valve with the gauges and connecting elements by which the valve is connected to a compressor.

Referring now to the drawings wherein like reference characters denote corresponding parts the improved compressor tester of this invention includes a master valve 10 having a graduated dial 11 with a pointer 12 on the upper end of a shaft 13, gauges 14 and 15, a high pressure connection 16 from the discharge side of a compressor 17 and extended through a nipple 18 on the intermediate part of the body 19 of the valve, a low pressure or suction connection 20 extended from a threaded nipple 21 at the lower end of the valve to the suction side of the compressor, a tube 22 having restricting tubes 23 and 24 at the ends connecting the high pressure tube 16 to the gauge 15, a tube 25 having restricting tubes 26 and 27 at the ends connecting the low pressure tube 20 to the gauge 14, a fixed venturi 28 connected across the tubes 16 and 20 and a bypass 29 also connected across the tubes 16 and 20.

The master valve 10 is provided with a threaded bore 30 in which the shaft or stem 13 is threaded, an enlarged bore 31 extended from an internally threaded section 32 to a point 9 in the intermediate part of the body 19, and a packing gland 33 in a threaded nipple 34 extended from the upper end of the valve body and having a gland 35 threaded therein; and the gland is provided with a flange 36 by which it may be rotated to provide takeup means for the packing material in the gland 33. The upper end of the valve body is provided with a threaded sleeve 37 and a lock nut 38 is threaded on the sleeve.

The upper end of the shaft 13 is provided with a threaded socket 39 in which a screw 40 is threaded which extends through a hub 41 of the pointer 12 whereby the pointer is secured on the tapering section 42 at the upper end of the shaft. The dial 11 is provided on a plate 43 at the upper end of a cylindrical housing 44 on the lower edge of which is a flange 45. The flange is positioned on a panel 46 through which the upper end of the master valve extends.

The master valve is provided with a venturi type seat 47 that coacts with a conical-shaped end 48 on the lower end of the shaft 13 and, as shown in FIGURE 3, a spring 49 is positioned on the shaft 13 in circumjacent relation thereto to prevent any end play that may occur in the shaft 13 through fare wear and tear, and the large and lower end of the shaft seats upon the upper end 50 of the venturi body 51 with the upper end positioned below a collar 52 extended around the shaft. The collar 52 functioning as an abutment for the upper end of the spring 49 while the lower end thereof abuts the upper end 50 of the venturi body 51. The pointer 12 provides means whereby the end 48 of the shaft 13 is adjusted in relation to the seat 47 and the dial 11 indicates the various adjusted positions of the end 48 of the shaft 13.

The high pressure tube 16 is connected to the nipple 18 by a coupling 53 and the low pressure tube 20 is connected to the nipple 21 by a similar coupling 54 that is threaded on the nipple 21. The nipple 21 is provided with an annular flange 55 that provides gripping means for a wrench or the like, when it is necessary to remove or replace the venturi body 51 from the internally threaded section 32.

The safety bypass valve 29 is provided with a ball 56 that is held against a seat 57 by a spring 58 and one side of the valve is connected to the tube 16 with a tube 59 and the opposite side to the tube 20 by a tube 60.

The venturi 28 is connected by a tube 61 to the tube 16 and by a tube 62 to the tube 20. The venturi is illustrated as being provided with a thumb screw 63 to shut off or open the venturi. The tube 20 is also provided with a low pressure safety valve 64 having a ball 65 urged against a seat 66 by a spring 67 and the tension of the spring is adjusted by a thumb screw 68. The venturi 28 is used when the capacity of the compressor being tested is larger than can be handled by the use of the master valve 10 alone.

The gauge 14 is provided with a pointer 69 that is positioned to coact with graduations 70 and the gauge 15 is provided with a similar pointer 71 that is positioned to coact with the graduations 72.

Operation

This tester for compressors is highly efficient on both sealed and open type compressor units and is invaluable for spotting trouble such as long running, not stopping, and pressure trouble and shows the client visibly the need for replacement of the parts.

To use the compressor tester select the number on the dial corresponding to the number in a chart showing the size and capacity of the compressor. Put the pointer or hand on a number higher, such as 100 to 200 points, moving the pointer counter clockwise, higher than the compressor's rated size and capacity. If, for example, a compressor displaces 2400 cubic inches, then the pointer 12 is positioned in relation to the dial 11 so that the pointer is in alinement with 2500 or 2600.

Connect the high pressure tube to the nipple 18 and the low pressure tube or hose to the nipple 21 below the venturi and after the tubes or sections of the hose are connected to the nipples the valves of the compressor 17 are opened. With the valves open and with an air hose 73 connected to a nipple 74 that is extended from the tube 60, air at from 10 to 15 pounds pressure is supplied to the unit by means of the air hose 73. The compressor 17 is then started with all valves in the compressor open.

After operating the compressor one minute should the hands indicate low, air or gas is added whereas should the hands indicate high, gas is permitted to escape by removing the end of the air hose 73 from the nipple 74. Should one hand indicate high and the other low turn the hand 12 of the dial clockwise or counter clockwise until both hands are aligned. When both of the hands are in alinement with each other the high and low pressure are in proper relation to each other and the compressor 17 is efficiently operating. The compressor should be warmed up by running five minutes to give the proper reading. As the compressor warms up the gas extends causing the hands or pointers to leave the aligned position and in such case a little gas is let out to even up the hands or place the hands in alignment.

After setting the pointer 12 on the dial 11 the pressure is lowered to bring the hands into alignment, should the hands fail to come into alignment, the pointer is reset on the dial. Resetting of the pointer 12 on the dial 11 is necessary as there may have been some oil remaining in the tester. Should the gauge hands come into alignment and the dial reading is too high run the compressor a few minutes to draw off excess oil in the tester system.

Reset the dial hand 12 and repeat the testing operation to provide too much or too little gas as suggested before.

It will be understood that modifications, within the scope of the appended claims, may be made in the design and arrangement of the parts without departing from the spirit of the invention.

What is claimed is:

1. In a compressor tester, the combination which comprises a vertically disposed valve body, a shaft threaded in the valve body and extended above the upper end of the body, a dial positioned around the upper end of the shaft, a pointer carried by the upper end of the shaft and positioned to coact with the dial, a venturi seat in the lower end of the valve body, the lower end of the shaft being positioned to coact with the venturi seat for regulating the area of the venturi, a connection extended from the valve body and positioned above the venturi seat, said connection extended to the high pressure or discharge side of the compressor, a connection mounted below the venturi seat for connecting the valve to the low pressure side of the compressor, a pressure gauge having a rotatable pointer thereon, a tube having restricted end portions connecting the high pressure line between the compressor and valve to the gauge, another gauge having a rotatable pointer thereon, said gauge being positioned so that the longitudinal axis of the pointer thereon may lie in a plane extended through the longitudinal axis of the pointer on the other gauge, a tube having restricted end portions between said other gauge and the low pressure connection from the compressor to the valve, the pointers on the gauges being mounted so as to be aligned in a common horizontal plane, each of said gauges having a calibrated dial for coaction with the pointers on the gauges, the calibrations on said dials being so arranged that the pointers will be aligned when there exists in the connections to the high and low pressure sides of the compressor specific high and low pressures, thus the position to which the pointer carried by the upper end of the shaft in the valve body has been adjusted in attaining the alignment of the pointers will be indicative of the capacity of the compressor and thus indicate the efficiency of the system being tested.

2. In a compressor tester, the combination which comprises a master valve having a venturi seat in the lower end, a shaft threaded in the valve, extended longitudinally therethrough and mounted whereby the lower end coacts with the venturi seat to regulate the area of the venturi, a pointer on the upper end of the shaft, and a dial extended around the shaft and positioned to coact with the pointer to determine the pressure of gas in the seat by positioning the shaft in the venturi, a tube extended from the intermediate part of the valve and spaced above the venturi for connecting the intermediate part of the valve body to the high pressure side of a compressor, a tube extended from the lower end of the valve body and from a point below the venturi to the suction or low pressure side of the compressor, first and second gauges each having a rotatable pointer mounted thereon, said gauges being positioned so that the longitudinal axis of said pointers may be alined in a common horizontal plane each of said gauges having a calibrated dial thereon, pointers for coaction with said dial, a tube connecting the second gauge to a high pressure line connecting the valve to the discharge of a compressor, a tube having restricted end portions connecting the first gauge to the suction or low pressure side of a compressor, a relief valve positioned on the tube providing the low pressure or suction connection to a compressor, a venturi connected across the high and low pressure tubes, a safety bypass valve also connected across the high and low pressure tubes, and an air hose connection in the connection of the bypass valve across the high and low pressure tube and through which gas under pressure is supplied to the system, the calibrations on said dials being so arranged that the pointers will be aligned when there exists in the tubes connected to the high and low pressure sides of the compressor specific high and low pressures, thus the position to which the pointer carried by the upper end of the shaft in the valve body has been adjusted in attaining the alignment of the pointers for the gauges will be indicative of the capacity of the compressor and thus indicate the efficiency of the system being tested.

References Cited in the file of this patent

UNITED STATES PATENTS

| 1,958,698 | Fox | May 15, 1934 |
|---|---|---|
| 2,014,314 | Defenbaugh | Sept. 10, 1935 |
| 2,098,677 | Saballus et al. | Nov. 9, 1937 |
| 2,151,976 | Koster | Mar. 28, 1939 |
| 2,172,095 | White | Sept. 5, 1939 |
| 2,733,600 | Sahs et al. | Feb. 7, 1956 |